United States Patent [19]
Skrentner et al.

[11] 3,983,770
[45] Oct. 5, 1976

[54] PISTON TURNING MACHINE

[75] Inventors: Frank C. Skrentner, Bloomfield Hills; James G. Beshke, Detroit, both of Mich.

[73] Assignee: F. Jos. Lamb Company, Warren, Mich.

[22] Filed: Oct. 30, 1975

[21] Appl. No.: 627,203

[52] U.S. Cl. ............................... 82/19; 82/14 R
[51] Int. Cl.[2] .................................. B23D 3/28
[58] Field of Search ........................ 82/14 R, 19

[56] References Cited
UNITED STATES PATENTS

| | | | |
|---|---|---|---|
| 2,017,513 | 10/1935 | Shatkin | 82/14 R |
| 2,116,262 | 5/1938 | Granberg et al. | 82/19 |
| 2,146,774 | 2/1939 | Snader | 82/19 |
| 3,869,946 | 3/1975 | Vignaud et al. | 82/14 R |

FOREIGN PATENTS OR APPLICATIONS

| | | | |
|---|---|---|---|
| 1,449,808 | 7/1966 | France | 82/19 |
| 1,169,756 | 9/1958 | France | 82/19 |
| 1,016,530 | 9/1957 | Germany | 82/19 |
| 333,630 | 12/1958 | Switzerland | 82/19 |

*Primary Examiner*—Harrison L. Hinson
*Attorney, Agent, or Firm*—Barnes, Kisselle, Raisch & Choate

[57] ABSTRACT

A lathe type machine for turning pistons, in which the cutting tool is caused to follow the surface contour of the cam which corresponds in shape to the desired contour of the piston to be machined. The cutting tool and a cam follower are mounted in spaced relation on an arm supported on a tool slide by means of an eccentric pivot pin, which when rotated in opposite directions shifts the tool toward and away from the axis of the work supporting spindle. Means are provided for automatically rotating the eccentric pivot pin through an arc of fixed angular extent in one direction when the tool slide reaches one end of its stroke and in the opposite direction through the same arcuate extent when the tool slide reaches the other end of its stroke. Means are also provided for rotating the eccentric pin slightly when desired to effect a change in size without affecting the extent of arcuate movement of the pin at opposite ends of the stroke of the tool slide.

19 Claims, 7 Drawing Figures

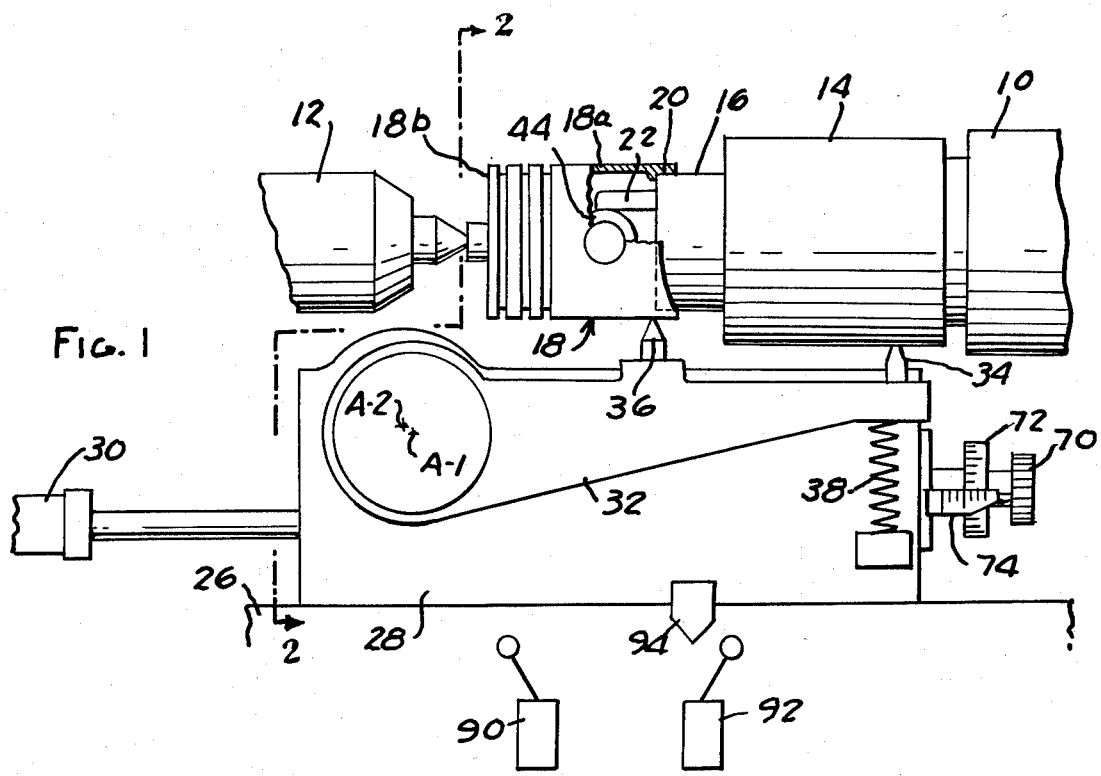
FIG. 1
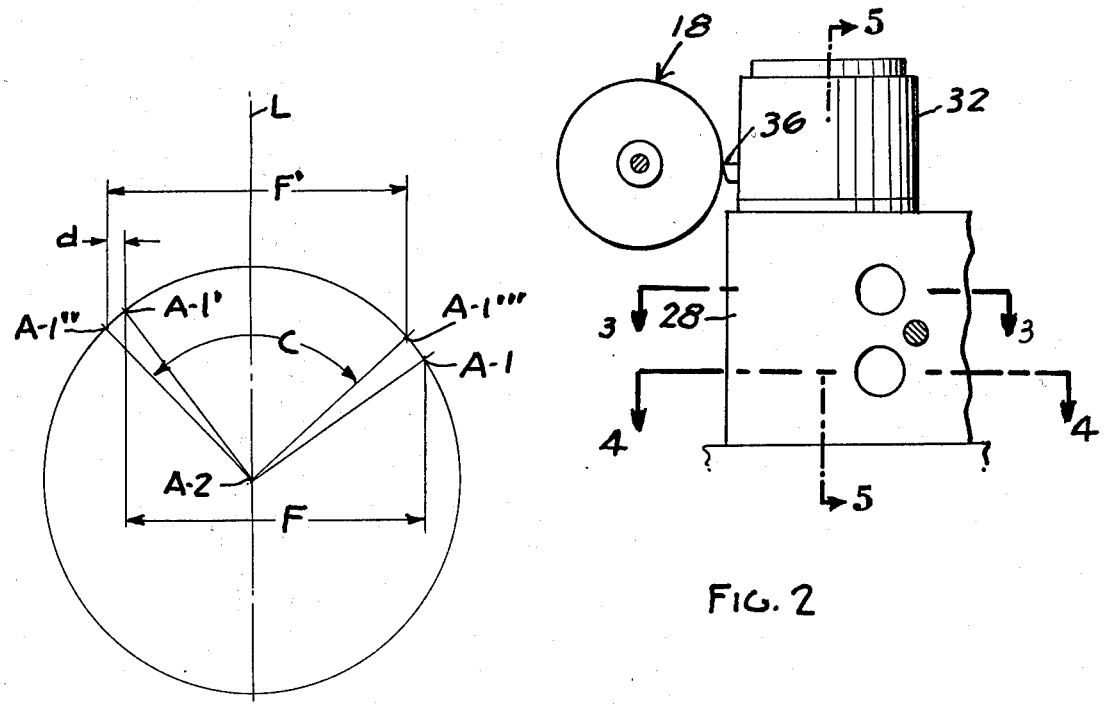
FIG. 6
FIG. 2

PISTON TURNING MACHINE

This invention relates to a lathe type machine tool and more specifically, to a machine tool of this type provided with a novel mechanism for adjusting the position of a cam controlled cutting tool relative to the axis of the work supporting spindle of the machine tool.

The present invention is particularly adapted for use on lathes for turning pistons. Pistons, as used in modern internal combustion engines, are one of the components that have been highly developed over the years. With the objects of long life and better engine performance the evolution has brought the piston close to the ultimate of perfection. Dimensions, materials, weights, the distribution of weights and the geometry have been the major fields of its development. It has been found that a true round cylindrical piston is far from the ideal for the desired performance in the engine. A shape that is closer to the ultimate in an elliptical shape as opposed to a perfectly round cylinder. This shape has been in general use for many years and several methods of producing this shape are well known in the art. It is also desirable that the piston be slightly tapered with the large portion being at the skirt end opposite the closed head end. In some engines, it is required that the head end be round and the elliptical shape start at a short distance from the head end and progressively increase towards the skirt end. These deviations from a true cylinder are small and on the order to 0.010 to 0.015 inches (0.254 to 0.831 mm.). It is also advantageous that these deviations be constant from piece to piece. During the development, it has been found that many other deviations from the cylindrical shape would be useful, therefore, new methods of manufacture had to be developed. The method now generally used utilizes a generally, but not truly, cylindrical cam in such a way to generate these complex shapes of pistons.

When machining the generally cylindrical portions of pistons on a production basis, one of the important requirements to accurately maintain shape and size of successively machined pistons is that a uniform amount of metal be removed by the final machining cut from all successive workpieces. This requirement is brought about by the distortion of the thin wall section resulting from tool pressure. These distortions will remain constant on successive pistons if the tool pressure remains constant. To fulfill this requirement, it is necessary to adjust the semifinish and finish cut simultaneously and by the same amount when compensation for workpiece size is required.

The present invention fulfills the above requirments by utilizing a generally cylindrical cam rotated with the piston in a lathe-like machine where a single point tool is arranged in such a way that the contour of the cam dictates the contour of the piston. The tool traverses the workpiece in one direction to semi-finish the piston and then feeds inwardly to make the finish cut when it transverses in the opposite direction. With the present invention the difference in the position of the tool between the semi-finish and the finish cuts (depth of cut) remains constant for successive pistons and any tool adjustment for workpiece size change relocates the position of the tool for both cuts by substantially the same amount. It can be seen that if the wall deflections remain constant, the resulting distortion of successive workpieces can be compensated for by the contour of the cam.

Accordingly, it is an object of the invention to provide a machine to turn the diametrical profile of a piston for an internal combustion engine to precise tolerances.

It is a further object to provide a machine to accurately maintain near identical size and shape of successive machined pistons.

A further object of the invention resides in the provision of means of a lathe type machine for adjusting the position of the cutting tool relative to the axis of the work supporting spindle in a novel and accurate manner.

Another object of the invention resides in the provision of a means on a machine of the type described for automatically feeding the cutting tool toward and away from the work supporting spindle when the tool slide reaches the opposite ends of its stroke to enable the tool to produce a semi-finish cut when the tool traverses the work in one direction and a finishing cut on the same workpiece when the tool traverses the work in the opposite direction.

These and other objects and advantages of the invention will be readily understood by those acquainted with the art of machining pistons from the following specifications and accompanying drawings.

In the drawings:

FIG. 1 is a fragmentary side elevational view of a piston turning lathe embodying the invention;

FIG. 2 is a view along line 2—2 of FIG. 1;

FIG. 6 is a diagramatic view showing the relative positions of the cutting tool for semi-finish and finish cuts as well as for size adjustment;

Figure 3:
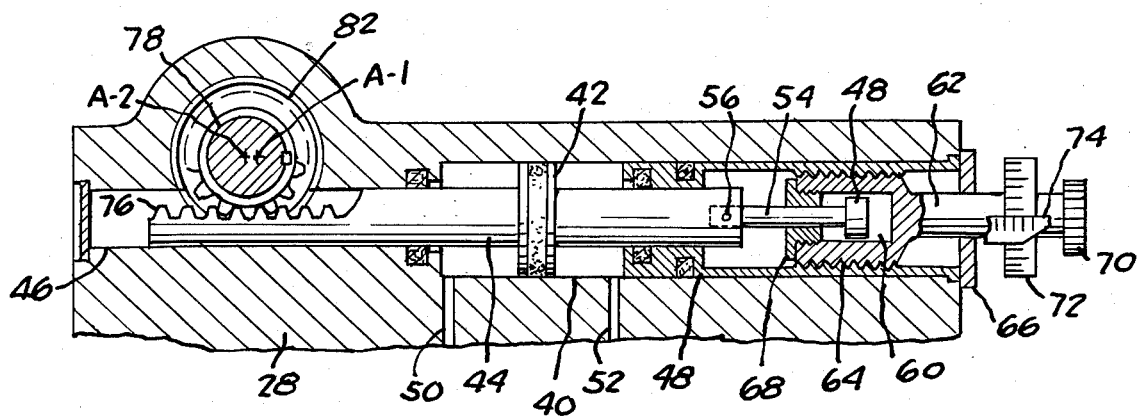
FIG. 3 is a view along line 3—3 of FIG. 2.
Figure 4:
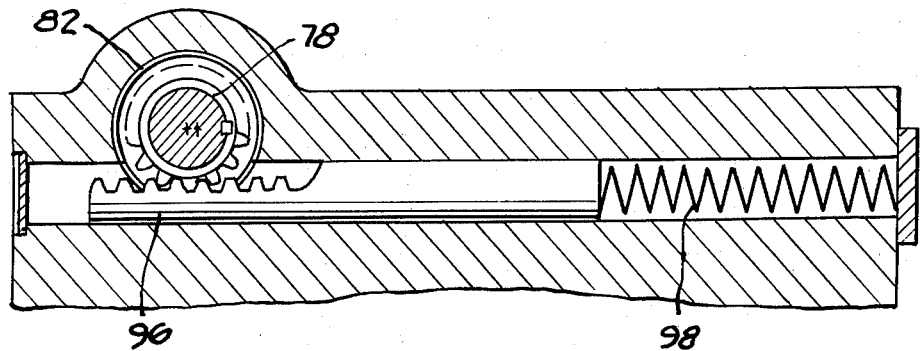
FIG. 4 is a view along line 4—4 of FIG. 2.

Referring now to the drawings, there is illustrated in FIG. 1 a lathe type machine tool having a motor driven spindle 10 and a tailstock 12. Spindle 10 has fixedly mounted thereon a cam 14 and a workpiece locating and driving chuck 16. For the purpose of description the workpiece to be machined is illustrated as a piston 18 having a head 18b and a skirt 18a. Chuck 16 is piloted in the counterbore 20 of the piston and has an extension 22 arranged to drive piston 18 by engagement with one of its internal bosses 24. This method of chucking the workpiece is merely illustrative of various devices for locating and rotating the workpiece. It will be apparent from FIG. 1 that when spindle 10 is rotated cam 14 and piston 18 will rotate therewith in unison.

The machine includes a base 26 on which a tool supporting slide 28 is mounted in suitable ways for movement in a direction parallel to the axis of spindle 10. A piston-cylinder assembly 30 may be employed for reciprocating slide 28. A tool support arm 32 pivotally mounted on slide 28 for movement toward and away from the axis of spindle 10. A cam follower 34 is mounted at one end of arm 32 and a cutting tool 36 is mounted intermediate the ends of arm 32. The pivot axis of arm 32 is designated A1. Cam follower 34 is urged against cam 14 by a spring 38 bearing against the free end of arm 32. Spring 38 biases arm 32 to maintain cutting tool 36 in cutting engagement with piston 18. The surface contour of cam 14 corresponds closely in shape with the desired surface contour on piston 18. Thus when spindle 10 is rotated and slide 28 is actuated by piston cylinder 30, tool 36 will cut a contour on piston 18 which corresponds closely to the contour of cam 14.

The mounting of tool 36 intermediate cam follower 34 and the pivot axis A1 is a preferred arrangement. With this arrangement cam 14 is initially formed to a size somewhat larger than the workpiece and the lever arm relationship of cam follower 34 and tool 36 with respect to the pivot axis A1 is such that cutting tool 36 produces a dimensionally smaller but geometrically faithful reproduction of the cam configuration on piston 18. The geometry allows a greater latitude in the manufacture of the cam. Any error in the profile on the cam will result in a much smaller error on the workpiece. In the arrangement illustrated, the length of cam 14 is greater than the length of the surface of the piston to be machined so that as slide 28 reciprocates through its stroke and cam follower 34 approaches the opposite ends of cam 14, tool 36 will traverse the workpiece to positions beyond the opposite ends thereof.

Referring now to FIG. 3, tool slide 28 is formed with a cylinder bore 40 in which a piston 42 is reciprocably mounted. Piston 42 is formed integrally with a piston rod 44. At one end piston rod 44 is slidably guided in a reduced bore 46. At its opposite end piston rod 44 is guided for reciprocation in a bore plug 48. Suitable seals are incorporated in this assembly to prevent leakage from bore 40 and across piston 42. On the opposite sides of piston 42, bore 40 is connected with fluid under pressure by means of ports 50, 52. When port 50 is pressurized, piston rod 44 is shifted axially to the right as viewed in FIG. 3 and when port 52 is pressurized the piston rod moves to the left. The stroke of piston rod 44 is controlled by a headed stop pin 54 connected to the right end of piston rod 44 as at 56. The enlarged head 58 of pin 54 is located in a bore 60 formed in the body of an adjusting screw 62. Screw 62 is in threaded engagement with bore plug 48 as at 64. Bore plug 48 is held in an axially fixed position in bore 40 by a cover plate 66 through which the stem of screw 62 extends. The open end of bore 60 is closed by a stop plug 68. When the knob 70 at the outer end of screw 62 is rotated the threaded engagement of the screw with plug 48 causes the screw to be shifted axially relative to plug 48. The extent of axial movement is indicated by a graduated dial 72 and a cooperating index finger 74.

With the above described arrangement it will be appreciated that the stroke of piston 44 is limited in a direction towards the left by the engagement of head 58 of stop pin 54 with plug 68 and at its opposite end by the interengagement of head 58 with the closed end of bore 60. The stroke of piston rod 44 can be varied by increasing or decreasing the length of bore 60. This can be accomplished if desired by simply making plug 68 longer or shorter. It will also be appreciated that when screw 62 is adjusted axially of plug 48 the opposite ends of the stroke of piston rod 44 are shifted axially but the length of the stroke is not altered.

Figure 5:
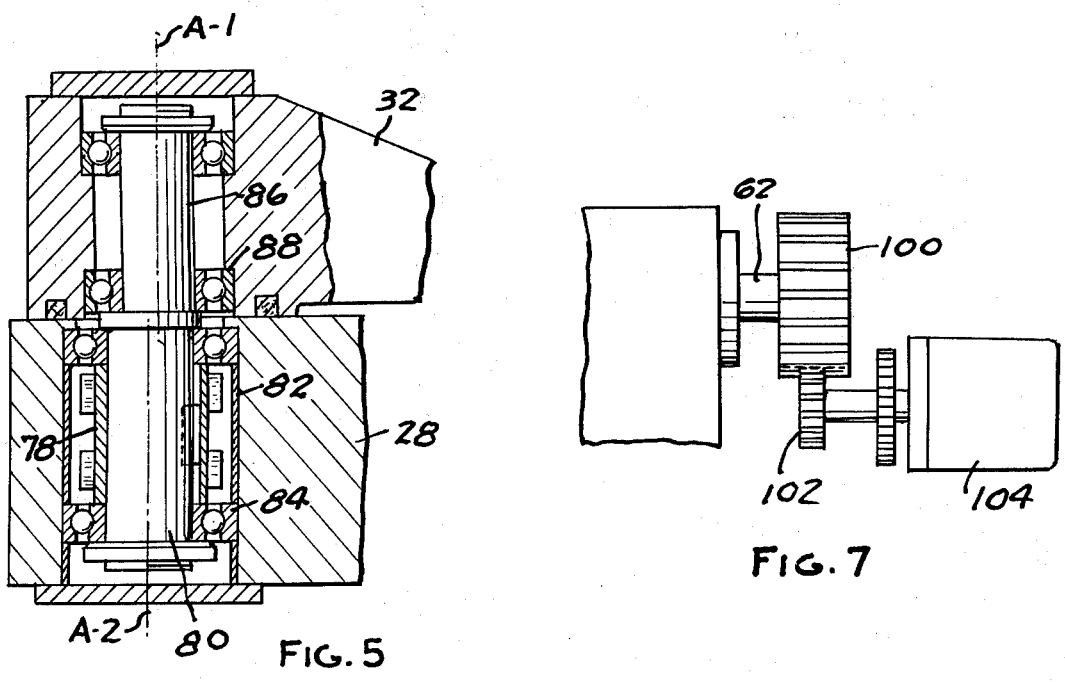
FIG. 5 is a view along line 5—5 of FIG. 2.

The left end of piston rod 44 is formed as a gear rack 76 which is in mesh with pinion 78. As illustrated in FIG. 5 pinion 78 is keyed to shaft 80 as at 81. Shaft 80 is journalled in a bore 82 in slide 28 by means of bearings 84. The axis about which shahft 80 rotates is designated A2. Shaft 80 has an extension 86 which is eccentrically located relative to the axis A2 of shaft 80. A central axis of extension 86 is designated A1. Tool support arm 32 is journalled on extension 86 by bearings 88 for pivotal movement about axis A1. With the arrangement shown in the drawings it will be appreciated that when piston rod 44 is moved towards the left the interengagement of gear rack 76 with pinion 78 will cause the pivot axis A1 to revolve clockwise about the axis A2 and when the piston rod 44 shifts to the right the axis A1 will revolve counterclockwise about the axis A2. When pinion 78 rotates in a clockwise direction as viewed in FIGS. 1 and 3, arm 32 pivots about cam follower 34 as a fulcrum in a direction away from the axis of spindle 10. When pinion 78 rotates in a counterclockwise direction arm 32 swings toward the axis of spindle 10. Thus rotation of pinion 78 in opposite directions causes the cutting tool 36 to be displaced toward and away from the axis of spindle 10. The extent to which the tool is displaced depends upon the stroke of piston rod 44 since the stroke of the latter determines the extent of angular movement of pinion 78. In the arrangement illustrated, tool 36 is located midway between cam follower 34 and axis A1 and the displacement of tool 36 will therefore be approximately one-half of displacement of axis A1 in a direction transversely of the axis of spindle 10.

In FIG. 6 there is illustrated on a highly enlarged scale the positions assumed by axis A1 in response to reciprocation of piston rod 44. Assume for example that the line designated L in FIG. 6 extends through axis A2 and the point of contact between cam follower 34 and cam 14. Also assume that when enlarged head 58 of stop pin 54 is in engagement with plug 68, the pivotal axis of arm 32 is located in the position designated A1 in FIG. 6. Under these conditions if port 50 is then pressurized to shift piston rod 44 axially to the right so that the enlarged head 58 of pin 54 engages the closed end of bore 60, axis A1 will revolve about axis A2 as a center to the position designated A1' in FIG. 6. Thus, the axis A1 has been displaced in a direction transversely of the axis of spindle 10 through the distance F and the tool will have been displaced toward the axis of spindle 10 a distance approximately equal to one-half F. When piston rod shifts to the limit of its movement toward the left, the pivotal axis of arm 32 will revolve from the position designated A1' back to the position designated A1.

The means for alternately pressurizing ports 50, 52 comprises a pair of microswitches 90, 92, on the base 26 of the machine which are adapted to be tripped by a dog 94 on tool slide 28 when the tool slide reaches either of the opposite ends of its stroke. When dog 94 trips switch 92 it stops the slide in a position where tool 36 will be beyond the skirt 18a of the piston, but cam follower 34 will still remain in contact with cam 14. When switch 92 is tripped it energizes proper circuitry to direct pressurized fluid to port 52. This causes piston rod 44 to shift towards the left and rotate pinion 78 in a clockwise direction. On the other hand, dog 94 trips switch 90 when tool 36 travels to the left just beyond the head 18b of piston 18 to stop slide 28 at the opposite end of its stroke and simultaneously pressurize port 50. When port 50 is pressurized, pinion 78 is rotated in a counterclockwise direction as viewed in FIG. 3. In order to remove all backlash from rack 76 so that pinion 78 will faithfully follow the movement of piston rod 44, a second gear rack 96 is arranged in engagement with pinion 78 and is urged in one direction by a spring 98.

If a slight size adjustment in the pistons being machined is required because of tool wear or for other reasons, this can be readily accomplished without substantially altering the depth of the finish cut. Such size adjustment is effected by simply rotating scew 62. For example, if the pistons being machined are approaching the high limit of the tolerance it becomes necessary to displace tool 36 slightly toward the axis of spindle 10. In other words when the tool is executing the finish cut the pivotal axis of arm 32 must be located slightly closer to the axis of the spindle. The present invention enables this to be accomplished without substantially affecting the depth of the finish cut by simply rotating screw 62 to change the linear position of travel of piston rod 44 and, accordingly, the position of the sector of angular displacement of pinion 78. When screw 62 is rotated, it is displaced axially of bore plug 48 so that both end limits of movement of enlarged head 58 of spin pin 54 are displaced to the same extent while the total displacement of head 58 remains the same. Thus, referring to FIG. 6, if screw 70 is rotated slightly such that when the enlarged head 58 engages the closed end of bore 60, the pivot axis of arm 32 has rotated to the position designated A1", the tool will have been advanced toward the work approximately one-half the distance designated $d$. When the tool has completed the finish cut and dog 94 trips switch 92, port 52 is pressurized to shift the piston rod 44 to the position where the enlarged head 58 engages cap 68. Since the stroke of piston rod 44 remains the same, on its return stroke the pivot of the axis of arm 32 will be displaced to the position designated A1''' and the total transverse displacement of the tool will be approximately one-half the distance designated F' in FIG. 6. Since the arcuate distance c is relatively small as compared with the arcuate distance C, it follows that the lateral distance F' is not substantially different from the lateral distance F. Therefore the depth of cut before and after the size adjustment produced by rotating screw 62 is not substantially altered. In this arrangement, a relatively constant depth of cut is also achieved by reason of the fact that the axis A1 traverses through a small arc because of the limits of travel of piston rod 44, and also because when the piston rod 44 travels from one end of its stroke to the other, the axis A1 is arcuately displaced from one side of the line L to the opposite side thereof as illustrated in FIG. 6. Thus even though a slight size adjustment is made between the machining of successive pistons, the amount of material removed by the finished cut remains substantially the same. After each workpiece has been finish machined, either the center of tailstock 12 or spindle 10 is axially retracted so that the finished piston can be removed and replaced with another to be machined.

Figure 7:
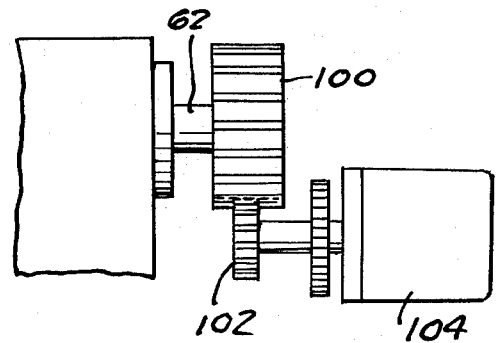
FIG. 7 is a fragmentary view of an alternate means for adjusting the apparaus for workpiece size change.

In FIG. 7 there is illustrated a modified arrangement for effecting size adjustment. In this arrangement, adjusting screw 62 has a gear 100 mounted thereon in place of the manual knob 70. Gear 100 is in engagement with a gear 102 driven by a reversible motor 104. Motor 104 may be one of a variety of types which have the ability to produce a precise increment of the output shaft rotation in response to a signal received from a control system which is initiated automatically by the gaging of a previously machined part or by other means, such as a manual push button. The output of motor 104 has the ability to turn screw 56 in either direction to adjust the tool toward and away from the axis of spindle 10, thus making the next workpiece either larger or smaller. Thus when the gauging mechanism determines that the size of the workpiece is approaching the tolerance limits established, it effects adjustment of screw 62 through gears 102, 100. The timing of this adjustment is preferably programed by suitable controls so that it occurs during the time when a workpiece is being changed.

We claim:

1. In a lathe type machine for turning workpieces, the combination comprising a driven rotary spindle, means on said spindle for mounting a workpiece thereon to rotate with the spindle, a cam spaced axially from the workpiece mounting means and arranged to be rotated with the spindle about an axis parallel with the rotary axis of the spindle, said cam having a generally cylindrical surface corresponding closely in shape with the desired machined surface of the workpiece, a tool slide movable in a path generally parallel to the axis of the spindle, a pivotal support on said slide, an arm mounted on said pivotal support for movement toward and away from the axis of said spindle, said arm having a follower thereon adapted to engage the cylindrical surface whereby to pivot said arm toward and away from said axis of said spindle in response to radial displacement of the cam follower resulting from rotation from the cam and axial movement of the slide, a cutting tool mounted on said arm and adapted to engage the outer surface of the workpiece when the follower is engaged with the cylindrical surface of said cam, said cutting tool being adapted to move with said arm toward and away from the axis of the spindle in response to a corresponding movement of said cam follower and means for displacing said pivotal support toward and away from the axis of spindle and therefore causes said arm to pivot about the point of contact between the cam follower and the cam as a center to displace the cutting tool a proportional amount relative to the axis of spindle.

2. The combination called for in claim 1 wherein the axial extent of the cylindrical surface of the cam is greater than that of the surface of the workpiece to be machined so that the cam follower remains in engagement with the cam when the slide has displaced the cutting tool axially beyond the opposite ends of the surface of the workpiece to be machined.

3. The combination called for in claim 2 including means responsive to movement of the slide to one end of its stroke for displacing the pivotal support through a predetermined distance toward the axis of the spindle.

4. The combination called for in claim 3 including means responsive to movement of the slide to the opposite end of its stroke for displacing said pivotal support through said predetermined distance away from the axis of the spindle.

5. The combination called for in claim 2 wherein said pivot support includes a pin rotatable about a fixed axis and said arm is pivotally connected with said pin for pivotal movement about an axis radially offset from the rotary axis of the pin, said means for displacing pivotal support comprising means for oscillating said pin about its axis through a predetermined arcuate sector.

6. The combination called for in claim 5 including additional means circumferentially displacing said arcuate sector about the axis of said pin in incremental amounts less than the angular extent of said arcuate sector.

7. The combination called for in claim 6 wherein the opposite ends of said arcuate sector are disposed on opposite sides of a line extending through the axis of said pin and the point of contact between the cam and cam follower.

8. The combination called for in claim 5 wherein said means for oscillating said pivot pin comprises an axially shiftable gear rack and gear means operatively connecting said gear track and said pivot pin.

9. The combination called for in claim 8 including means for limiting axial displacement of said gear track to a predetermined fixed stroke.

10. The combination called for in claim 9 wherein said stroke limiting means comprise a pair of abutments spaced apart a predetermined distance and means for bodily displacing both of said abutments simultaneously equal distances in the same direction whereby to effect displacement of the tool independently of the fixed stroke of said rack.

11. The combination called for in claim 1 including means for reciprocating said slide through a stroke greater than the length of the surface of the workpiece to be machined and less than the length of the cylindrical surface of the cam, and means for actuating said pivotal support displacement means to shift the tool toward the axis of the spindle a predetermined amount when the slide reaches one end of its stroke whereby the tool produces an additional cut on the workpiece when the slide moves toward the opposite end of its stroke.

12. The combination called for in claim 11 including means for shifting the tool away from the axis of the spindle said predetermined amount when the slide reaches said opposite end of its stroke whereby to position the tool for a semi-finish cut on the next successive workpiece.

13. The combination called for in claim 12 wherein said means for displacing said pivotal support includes a reciprocable member operatively connected with said pivotal support such that the position of the pivotal support in a direction transversely of the axis of the spindle is responsive to the position to which thhe reciprocable member is moved, means limiting reciprocation of said reciprocable member in opposite directions to a predetermined stroke to produce shifting of the tool said predetermined amount and means for bodily shifting said stroke limiting means to adjust the positions of the opposite ends of said stroke independently of the length of said stroke.

14. In a lathe type machine for turning workpieces, the combination of a driven rotary spindle having chucking means thereon, a tool slide reciprocable in a path parallel to the axis of the spindle through a stroke at least slightly longer than the surface of the workpice to be machined, a cutting tool mounted to move with said slide, means for supporting the cutting tool on the slide for movement toward and away from the axis of the spindle, a member mounted on said slide for reciprocation through a predetermined stroke and operably engaged with said tool support means for displacing the tool toward the spindle when said member is shifted in one direction and for displacing the tool away from the spindle when said member is shifted in the opposite direction, the extent of displacement of the tool toward and away from the spindle being proportional to the stroke of said member, means for reciprocating said member in opposite directions through a stroke of predetermined length, and means responsive to movement of the tool slide to one end of the stroke to shift said member through its stroke in one direction and responsive to movement of the tool slide to the opposite end of its stroke to shift said member through its stroke in the opposite direction whereby to cause the tool to produce an initial cut on the workpiece when the slide traverses the work in one direction and to produce a finish cut on the workpiece when the slide traverses the workpiece in the opposite direction.

15. The combination called for in claim 14 including means limiting movement of said member in opposite directions to determine the length of the stroke of said member and means for bodily shifting said stroke limiting means to displace the opposite ends of said stroke the same amount in the same direction whereby to vary the finish size of two successively machined workpieces without substantially affecting the depth of the finish cut.

16. The combination called for in claim 15 including means for varying the length of the stroke of said member to vary the depth of said finished cut.

17. The combination called for in claim 16 wherein said tool support means includes an eccentric pivot and said reciprocable member is adapted when reciprocated to rotate said eccentric pivot and thereby displace the tool toward and away from said spindle.

18. The combination called for in claim 15 wherein said stroke limiting means comprises a pair of spaced abutments mounted on a common support and said means for bodily shifting said stroke limiting means comprises a means for displacing said common support.

19. The combination called for in claim 18 wherein said means for displacing said common support includes means forming a threaded connection between said common support and said slide.

* * * * *